United States Patent [19]
Maruyama et al.

[11] Patent Number: 5,323,203
[45] Date of Patent: Jun. 21, 1994

[54] WIRELESS REMOTE CONTROL APPARATUS FOR CAMERA

[75] Inventors: Atsushi Maruyama, Yokohoma; Masataka Ide, Hachioji, both of Japan

[73] Assignee: Olympus Optical Co., Ltd., Tokyo, Japan

[21] Appl. No.: 808,071

[22] Filed: Dec. 10, 1991

Related U.S. Application Data

[63] Continuation of Ser. No. 510,009, Apr. 17, 1990, abandoned.

[30] Foreign Application Priority Data

Apr. 21, 1989 [JP] Japan .................................. 1-103066

[51] Int. Cl.⁵ ........................ H04B 1/04; G03B 17/38
[52] U.S. Cl. .................................. 354/410; 354/266; 340/825.64; 340/825.76
[58] Field of Search ................. 354/410, 412, 411, 67, 354/435, 441, 456, 266; 340/825.64, 825.76

[56] References Cited

U.S. PATENT DOCUMENTS

| | | | |
|---|---|---|---|
| 4,036,762 | 7/1977 | Troetscher et al. | 354/131 |
| 4,724,456 | 2/1988 | Ishimura et al. | 354/484 |
| 4,864,340 | 9/1989 | Kaneko | 354/266 |
| 4,931,790 | 6/1990 | Kobayashi et al. | 340/825.64 |

*Primary Examiner*—David M. Gray
*Assistant Examiner*—Cassandra Spyrou
*Attorney, Agent, or Firm*—Louis Weinstein

[57] ABSTRACT

A wireless camera remote control apparatus comprises a transmitter unit for transmitting an activating pulse and a plurality of code pulse signals corresponding to given operations of the camera; and a receiver unit responsive to a code defined by the plurality of code pulses for causing the camera to execute a given operation. The wireless camera remote control apparatus has an immunity to disturbance noise and a reduced power consumption.

37 Claims, 9 Drawing Sheets

WIRELESS REMOTE CONTROL APPARATUS FOR CAMERA

This is a continuation of application Ser. No. 510,009, filed Apr. 17, 1990 now abandoned.

FIELD OF THE INVENTION

The present invention relates to a wireless remote control apparatus for a camera, and in particular to an infrared wireless remote control apparatus for a camera, which is detachably mounted to the camera.

BACKGROUND OF THE INVENTION

The wireless remote control apparatus used for home electronic appliances generally uses infrared rays having a wave length on the order of 900 to 950 nm. A transmitter of the remote control apparatus transmits a signal which has been modulated at about 40 kHz with a code to be transmitted. On the other hand, a receiver detects the signal to demodulate it for eliminating the 40 kHz component in the carrier to obtain data (refer to a brochure "Countermeasure for preventing malfunction of infrared remotely controlled home appliances" published by a Foundation Kaden Seihin Kyokai, July, 1987).

In general, the wireless remote control apparatus for a camera intermittently emits infrared light as is done similarly with an electronic flash to increase an effective range of the infrared light having flash intervals representative of transmission data unlike the modulation system of the remote control for home appliances.

However, remote control apparatus using a modulation system for home electronic appliances requires a modulation circuit for modulating a signal with a transmission code and a demodulating circuit for demodulating the modulated code for transmitter and receiver, respectively. These circuits are complicated and large in size, so that they are very cumbersome for a compact camera having a restricted component installation area and cost.

On the other hand, since flash type of remote control apparatus which is used for remotely controlling the camera includes a transmission circuit similar to an electronic flash circuit, the circuit components are large in size and scale. Accordingly, it is hard to adopt such a flash type of remote control apparatus for a camera in which a camera body and a remote control unit are integral with each other during normal picture taking and the remote control unit is removed from the camera body for taking a picture using the remote control. Since the flash interval represents transmission data in this flash type remote control, complicated codes can not be transmitted. In addition the camera sometimes malfunctions on exposure to light from other electronic flash and a fluorescent lamp, for example.

Furthermore both types of remote control have a common problem that a receiver circuit consumes power on standby while waiting for a signal from a transmitter, which power is the the same as that consumed on reception of a transmitted signal. Even during normal picture taking mode, the remote control circuit continues to operate, resulting in wasteful consumption of power. This will be a cause of premature depletion of batteries in a system which uses batteries.

SUMMARY OF THE INVENTION

It is, therefore, an object of the present invention to provide a remote control apparatus for a camera, having a simple receiver circuit capable of discriminating disturbance noises from a fluorescent lamp, etc. and in which premature depletion of batteries can be prevented by suppressing the wasteful consumption of power on reception of a remote control circuit.

In accordance with the present invention, there is provided a wireless remote control apparatus comprising a receiver unit for use in connection with a camera and an independent transmitter unit; said transmitter unit including means for generating an activating pulse for activating said receiver unit of said camera and code pulses having intervals each corresponding to a given operation of the camera; said receiver unit including means for detecting the signals transmitted from the transmitter unit; means for activating said receiver unit in response to the activating pulse of the pulses detected by said detecting means; means fop decoding the codes represented by the intervals among the code pulse signals of the detected code signals; and means fop causing the camera to execute predetermined operations in accordance with the code decoded by said decoder.

DETAILED DESCRIPTION OF PREFERRED EMBODIMENT

The present invent ion wi11 be described by way of an embodiment with references to the drawings.

Figure 1:
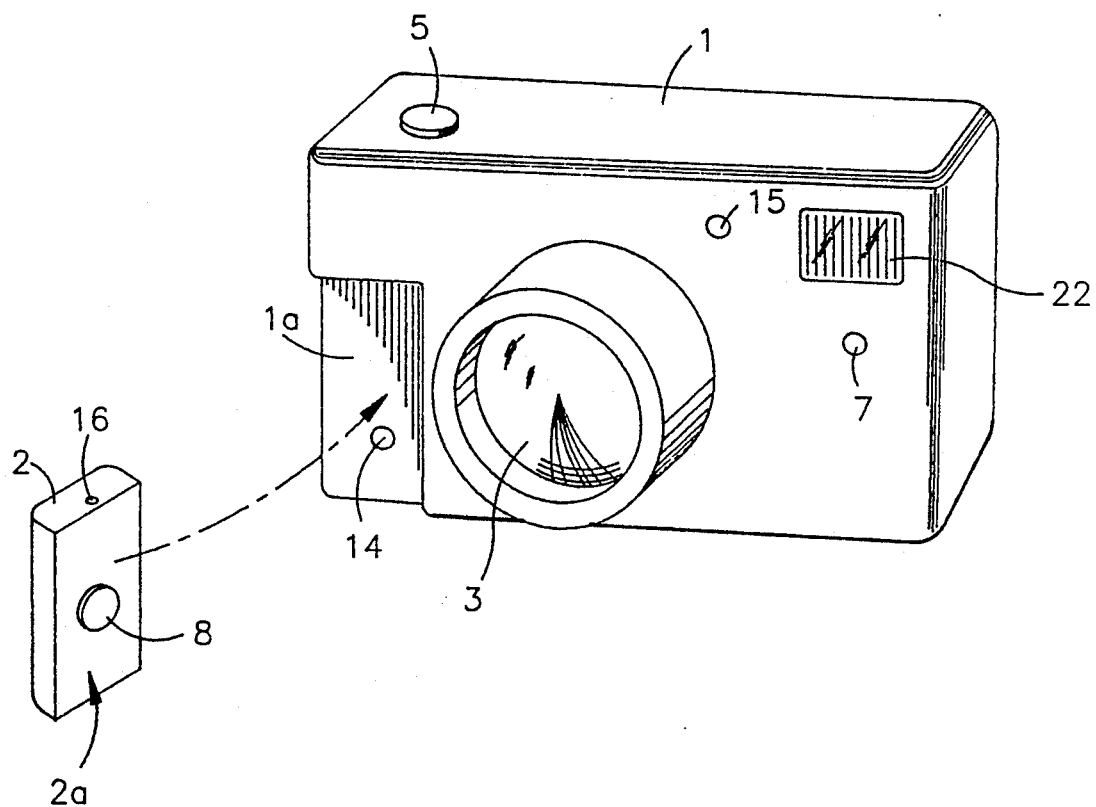
FIG. 1 is a perspective view showing a camera and a remote control transmission unit which is removed from the camera.

Referring now to FIG. 1, there is shown a first embodiment of a wireless remote control apparatus for a camera of the present invention A transmitter unit 2 of the wireless remote control apparatus is mechanically or magnetically detachably mounted on a mounting recess provided on the front side of the camera body 1 at the right end thereof. When the transmitter unit 2 is mounted on the camera body 1, it forms a camera grip (not shown) which is readily gripped by a user and facilitates handling and use of camera 1. A taking lens 3 and an electronic flash window 22 and the like are disposed on the front side of the camera body 1. A release button 5 is disposed on the upper side of the camera. A light receiving element 15 including an infrared light SPD (silicon photodiode) disposed on the front side of camera body 1 is provided for respectively receiving a remote control signal including infrared light pulses emitted from the transmitter unit 2. A light indicating element including a light emitting diode which lights when the element 15 receives the remote control signal, is also disposed on the front side of the camera body 1, as shown.

The transmitter unit 2 is provided with a remote control release button 8 on the rear side 2a thereof as shown in FIG. 1, which buttons are accessible when the unit 2 is removed from its mounting location on the camera body 1. The unit 2 is furthermore provided with a transmitting element 16 including an infrared light emitting diode IRED for emitting infrared light pulses at the upper side thereof. When the unit 2 is mounted on the camera body 1, the button 8 and the element 16 are concealed in the mounting recess 1a so that they are not exposed to view.

Figure 2:
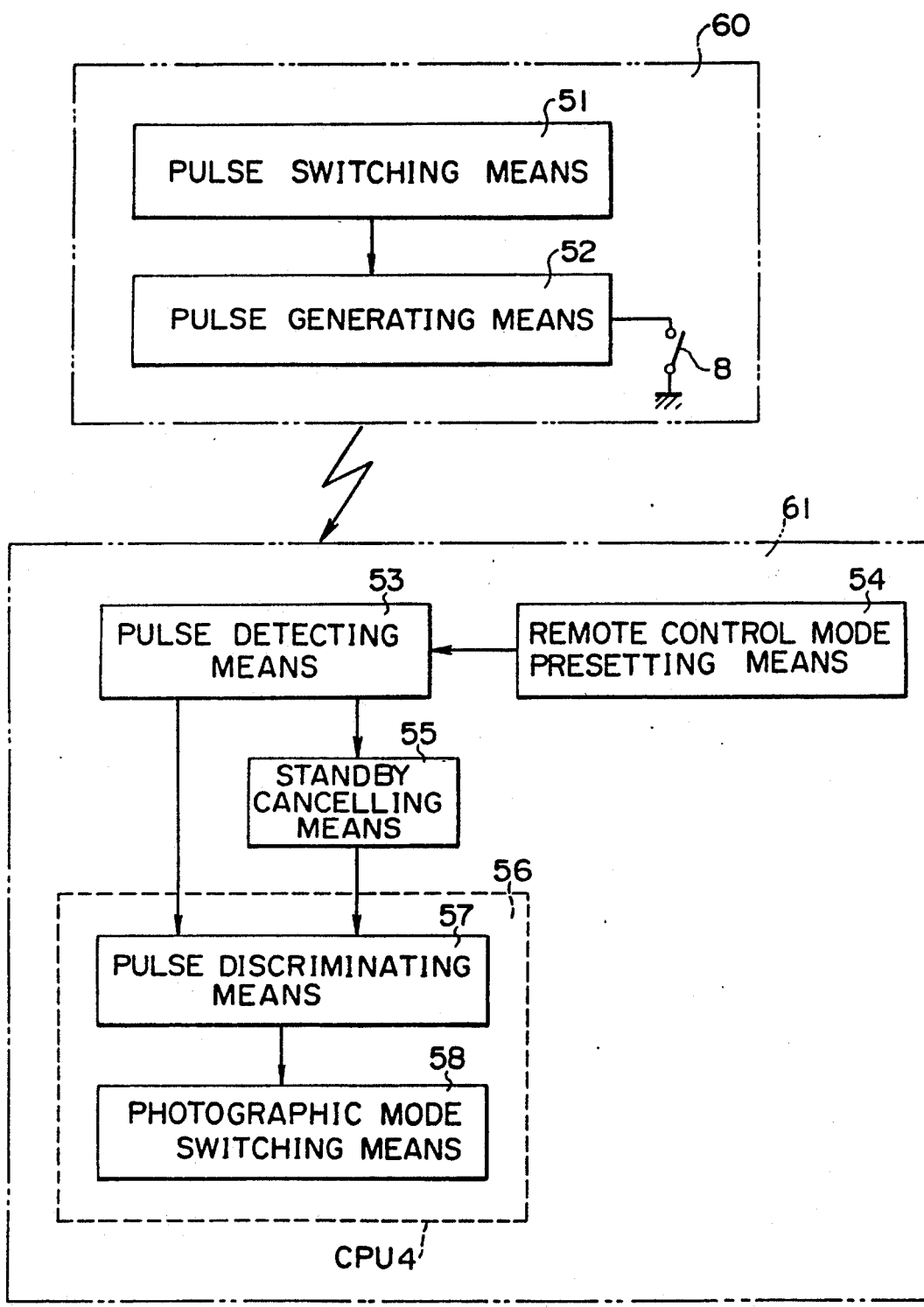
FIG. 2 is a block diagram showing the concept of a wireless remote control apparatus of the present invention.
Figure 4:
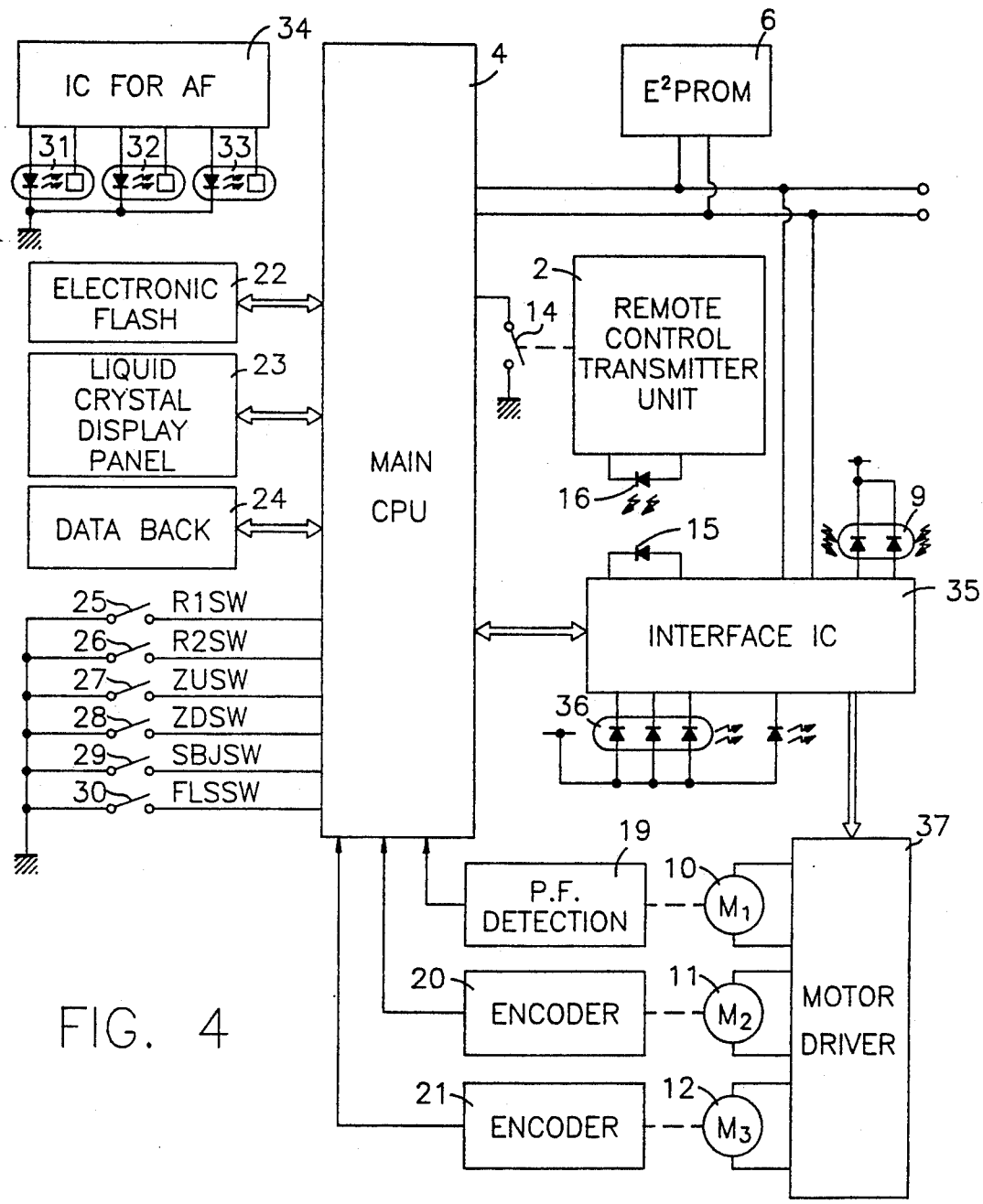
FIG. 4 is a block diagram showing a camera on which a wireless remote control apparatus for a camera of the present invention is mounted.

The thus-formed transmitter unit 2 has a built-in remote control transmitter circuit 60 which is shown in FIGS. 2 and 4. The camera body 1 has a built-in remote control receiver circuit 61 (see FIG. 2) responsive to a remote control signal.

Referring now to FIG. 2, there is shown a basic structure of a remote control apparatus for a camera of the present invention.

A wireless remote control transmitter 60 comprises a pulse switching means 51 and a pulse generating means 52. The pulse switching means 51 is adapted to change a pulse train which is synchronous with the commercial power frequency 50 Hz or 60 Hz and is adapted to provide several kinds of pulse trains for avoiding interference with other cameras and fop changing picture taking modes. When an operator off the remote control apparatus depresses a switch 8, a pulse signal train is transmitted from the pulse generating means 52 including the element 16 and is detected by a pulse detecting means 53 including the element 15 in a camera body 1.

Remote control mode presetting means 54 determines whether or not the pulse detecting means 53 of the camera body 1 should commence to detect pulses. The output from the pulse detecting means 53 is inputted to the standby cancelling means 55. The output of the standby cancelling means activates the CPU4 which comprises a pulse discriminating means 57 and a picture taking or photographic mode changing means 58. If the output of the pulse detecting means 53 does not have a predetermined pulse interval, the pulse discriminating means 57 invalidates the pulse input. If the output has a predetermined pulse interval, the photographic mode switching means 58 changes the picture taking modes depending upon the pulse signal train.

Figure 3:
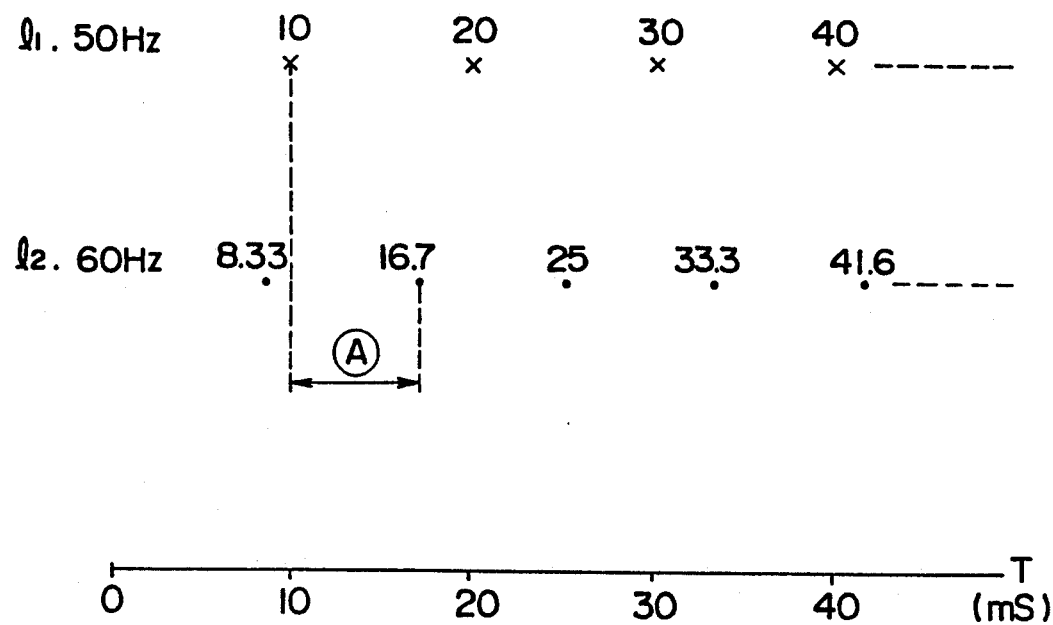
FIG. 3 is an explanatory view showing the timing relationship of a noise pulse radiated from 50 Hz or 60 Hz commercial power source.

Referring now to FIG. 3, there is shown the timing relation of noise pulses emitted from 50 Hz or 60 Hz commercial power sources. If a noise pulse is generated by a fluorescent lamp and the like at T=0 ms on a line $l_1$ in which a half cycle of 50 Hz is plotted and on a line $l_2$ in which a half cycle of 60 Hz is plotted, there is a likelihood that consecutive noise pulses will be generated at points represented by x or .. It is preferable that the pulse interval positions lie within a range represented by    in FIG. 3 in order to avoid interference with the noises of 50 Hz and 60 Hz.

Referring now to FIG. 4, there is shown a block diagram of a wireless remote control apparatus which is incorporated into a camera. A main CPU4 executes a sequential control in accordance with a program stored in a ROM disposed therein for governing the operations of the peripheral ICS.

An automatic focussing (AF) IC34 measures the distance between the camera and an object to be photographed by an infrared active method and transfers the resultant information on the object distance to the main CPU4. Light projecting and receiving units 31, 32, 33, each comprising an IRED and a PSD which are operatively disposed with each other are connected to the AF IC34. Three points in a photographic frame are distance-measured by these light projecting and receiving units 31, 32, and 33.

If there are some variations in the basic line length between IRED and PSD which form the light projection and receiving units 31, 32, and 33, the resultant information on the object distance is offset from the measured distance data which would be obtained when there are no variations in the basic line length. Accordingly, the measured distance data are compensated for by using the data stored in the E²PROM 6 for suitably correcting the data.

E²PROM 6 is a non-volatile memory device which stores adjusting data for correcting errors on assembly of the camera, which may occur due to mechanical variations and the like in the lens position when the measured distances and variations therein are transformed into data on lens position.

An interface IC35 carries out the measurement of the the object brightness and the temperature in a camera, the control of a motor driver 37 and reception of an infrared signal. A sensor which measures the object brightness is comprised of an array of light receiving elements 9 comprising two sealed light receiving elements connected to the interface IC35. Averaged and spot brightness measuring is conducted by this sensor so that the photometric result is supplied to the interface IC35. The IC35 converts the photometric result into voltage information to provide it to the CPU4. The CPU4 then executes the determination of rear light and the operation of exposure based upon the voltage information.

Measuring of the temperature in the camera is performed just after the power of the camera has been turned on. There is a likelihood that the temperature of the interface IC35 per se has been elevated just after the film has been wound. In the latter case, the temperature is not equal to the temperature in the camera. In the embodiment, the position of the taking lens is compensated for by using the afore-mentioned temperature data since the lens barrel which supports the taking lens elongates or contracts to deteriorate the focussing accuracy. The temperature data may be used for compensation of a mechanical member or IC output which may change depending upon the temperature as well as compensation of a lens barrel.

A motor driver 37 drives a film feeding motor 10, shutter driving motor 11, and a zoom motor 12. The rotational positions of the film feeding motor 10, the shutter driving motor 11 and the zoom motor 12 are detected by P.F detector 19, an encoder 20 and an encoder 21, respectively, so that they are supplied to the main CPU4. On the other hand, the motor driver 37 is operated in response to a motor selection signal, and signals from the interface IC35 representative of normal or reverse rotation, braking and stopping of a motor. The driving voltage for the motor driver 37 may be preset to a desired voltage value.

A signal light which is emitted from IRED 16 mounted on the outside of an infrared remote control transmission unit 2 is received by a light receiving element 15 conneced to the interface IC35 where it is photoelecrically converted into an electrical signal. The converted electrical signal is wave-form shaped at the interface IC35 and then fed to the CPU4. The CPU4 saves power consumption by normally rendering standby state (clock operates and a program counter stops) in order to prevent premature depletion of a power battery (not shown). Since a transfer line along which the signal having the wave form which has been shaped at the interface IC35 is transferred to the CPU4 is connected to an input terminal of the CPU4 having a standby cancelling function, the standby state may be immediately cancelled to start remote control processing if a remote control signal is received even when the CPU4 is in the standby state. The remote control transmission unit 2 is housed in the camera. When the transmission unit 2 is detached from the camera 1, RM switch 14 is automatically switched from OFF to ON responsive to the removal of the unit. This allows the CPU4 to recognize that the remote control unit 2 has been removed and that it is in a remote control mode. The RM switch 14 also has a standby cancelling function for the CPU4.

In other words, the CPU4 has three states, such as standby state, operative state and sleep state in both remote control mode and normal mode using no remote control. In the standby state the CPU4 waits for a remote control signal or an operation instruction generated by the actuation of a manual switch of a camera and a clock operates and a program counter stops. In the operative state, the CPU4 causes the camera to execute a predetermined operation after the standby state is cancelled in response to the instruction. The sleep state is commenced when the CPU4 has not received any operation instruction for more than a predetermined period of time, for example 90 seconds in the standby state. The clock stops in this sleep state. As mentioned below, cancellation of the sleep state is possible only by the actuation of a manual member of the camera, not possible by the reception of the remote control signal from a remote control transmitter unit.

A liquid crystal display panel 23 is adapted to display the mode, and the number of the film frames and the like in response to the signals from the CPU4.

A data back 24 imprints the date on the film responsive to the signal from the CPU4. LED36 is an indicator in a finder to respectively indicate AF range-finding completion, flash alarm and red-eye alarm. The term "red-eye" used herein means a red-eye phenomenon such that the eyes of a person to be photographed glow red when a picture is taken by flashing the electronic flash 22. The red-eye alarm urges a user to change the camera into a red-eye prevention mode (hereinafter explained) when the red-eye phenomenon is predicted.

LED7 not only displays a self-timer mode, but also displays that a remote control signal has been detected.

A first release switch (hereafter abbreviated as R1SW) 25 is a switch which is operated when a re/ease button 5 is half-depressed. When the switch 25 is turned on, range-finding and photometry are conducted so that the measured distance value and the photometric value are stored in the CPU4.

A second release switch 26 (hereafter abbreviated as R2SW) is a switch which is operated when the release button is fully depressed. When the R2SW 26 is depressed, movement of the taking lens and exposure control is performed based upon the distance measurement and the photometric value.

Zoom up switch (hereafter abbreviated as ZUSW) and zoom down switch (hereafter abbreviated as ZDSW) 28 are switches for controlling the zooming operation of a zoom lens. When the ZUSW 27 and the ZDSW 28 are operated, the zoom lens is zoomed to tale and wide positions respectively. The zooming operation is prohibited at both tele and wide extremities.

Multi-function mode switching switch (hereinafter abbreviated as SBTSW) 29 is a switch for selecting a spot brightness measuring mode, an automatic zoom mode, a continuous picture taking mode, and a self-timer mode by repeating on-off operations. When SBTSW 29 is turned to a spot mode, a sensor which performs range-finding in the center of the photographic frame is selected from the light projecting and receiving elements 31, 32 and 33, each comprising an operatively disposed IRED and PSD. The photometry by photometric light receiving element array 9 is conducted by selecting a spot photometric sensor. When the SBTSW 29 is rendered to an automatic zoom mode, the focal distance of the taking lens may be changed so that the ratio of the size of an object to be photographed with respect to the photographic frame is kept constant based upon the measured distance between an object to be photographed and the camera.

A flash mode switching switch (hereinafter abbreviated as FLSSW) 30 is a switch which changes red-eye flash mode, flash off mode, forced flash mode and multi-flash mode by repeating on-off operations. Red-eye prevention flash mode is a mode having a flash photographic function to prevent the red-eye phenomenon from occurring since the red-eye phenomenon readily occurs for some races, this red-eye prevention flash mode is stored in RAM of the CPU4 or $E^2PROM$ 6 unless the flash mode is changed.

In the multi-flash mode, four flashes are generated in response to "L" active signals at predetermined intervals while the shutter is opened as hereinafter explained in FIG. 8. This mode enables the tracing of a swung golf club to be photographed consecutively four times in one frame.

Figure 5:
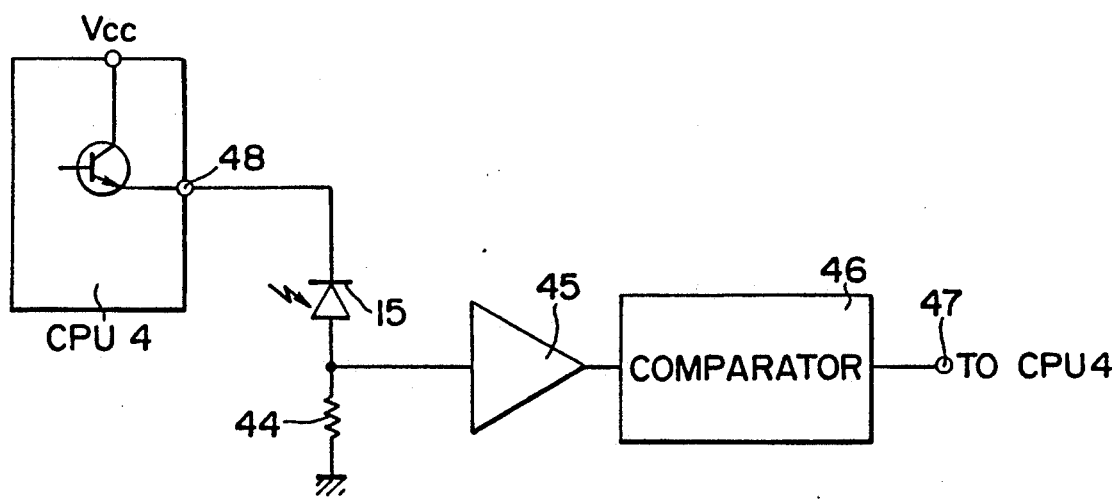
FIG. 5 is a block diagram of a receiver circuit incorporated in an interface shown in FIG. 1.

Referring now to FIG. 5, there is shown a block diagram in a receiver circuit incorporated in the interface IC35. In the drawing, when the light receiving element 15 is exposed to a pulse light forming a remote control signal, a photocurrent proportional to the light intensity flows through a resistor 44 and is converted into a voltage across the resistor 44. After the voltage signal is amplified by an amplifier 45, the amplified voltage is shaped by a comparator 46 and is then outputted to the CPU4 from a terminal 47.

The photocurrent flowing through the light receiving element 15 is subject to switching at the CPU4 connected at the terminal 48. The photocurrent is turned off for saving power when the remote control mode is cancelled. The switching is not conducted between the resistor 44 and the ground, but is conducted between the cathode and VCC of the light receiving element 15 and Vcc point. The reason why such switching is conducted will now be explained.

The terminal 48 carries noises generated due to power voltage fluctuation from the switching CPU4. The noise voltage component is voltage-divided by the impedances of the light receiving element 15 and the resistor 44 so that the divided noise component is applied to an input terminal of the amplifier 45. However, the noise is fed to the CPU4 as an error output from the receiver circuit since the amplification factor of the amplifier 45 is in the order of 500 to 1000. The impedance of the light receiving element 15 is considerably larger than that of the resistor 44 since the light receiving element 15 has an impedance on the order of 1 MΩ while the resistor 44 has an impedance on the order of several kΩ. Therefore, the noise on the terminal 48 can be attenuated into a very small amplitude at an impedance ratio by switching at the side of cathode of the light receiving element 15.

Operation of the thus formed embodiment will be described with reference to the flow charts of FIGS. 6 to 9.

Figure 6:
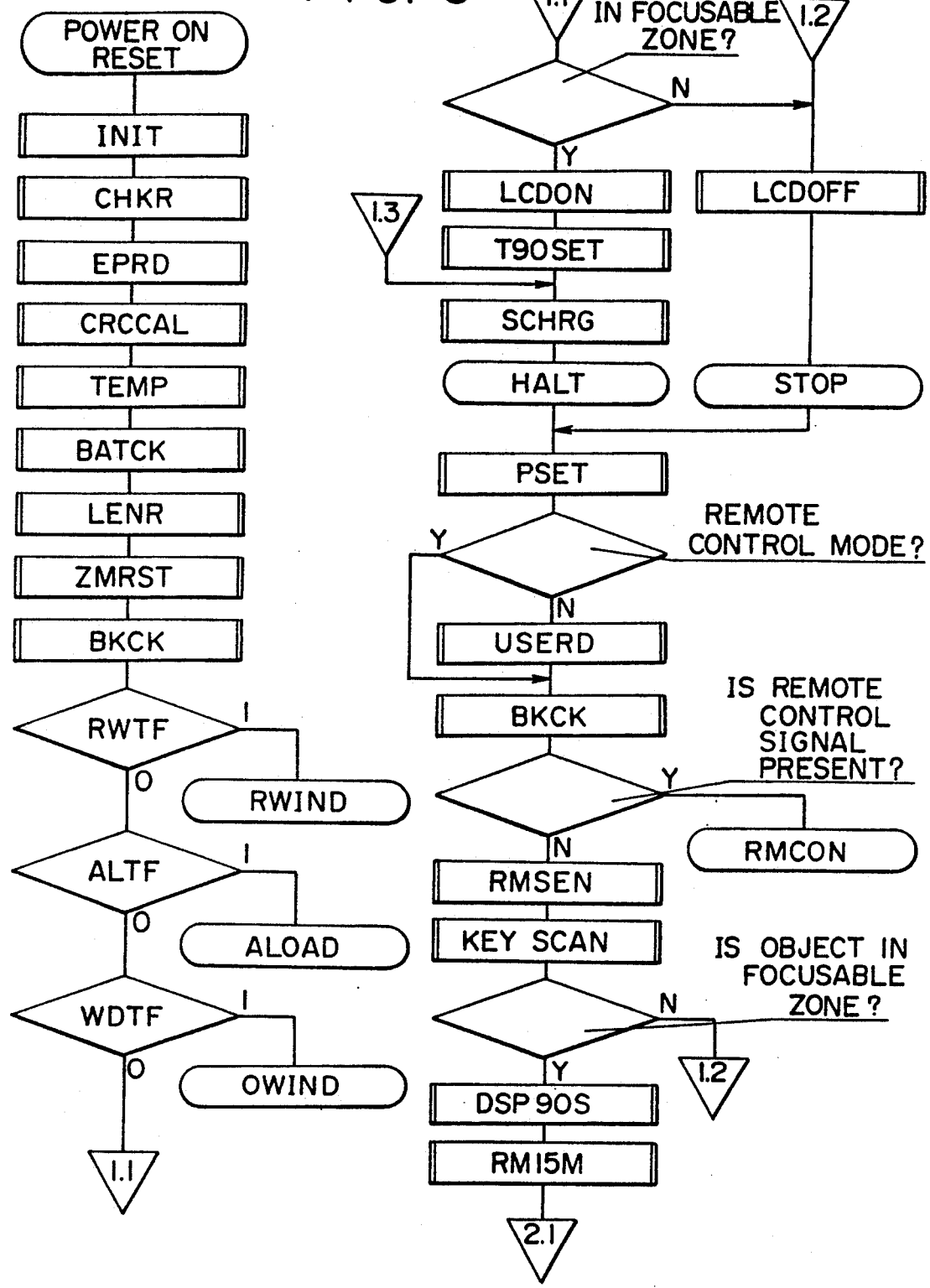
FIGS. 6 and 7 are flow charts explaining the content of the sequence control executed in a main CPU shown in FIG. 4.

Referring now to FIGS. 6 and 5, there are shown the flow charts for explaining the content of main sequence control of the main CPU4. After "POWER ON RESET", initialization of the RAM of the CPU4 is performed at "INIT". If a communication request is Generated from an external communication device, communication processing is performed at "CHKR". The adjusting data and the like which are stored in E²PROM 6 (refer to FIG. 4) are written into the RAM of the CPU4 at a step "EPRD". The data which have been written into the RAM of the CPU4 at a step "EPRD" are regularly checked by a routine "CRCEXE" (hereafter explained) as a countermeasure for the destruction by incoming noises. It is a routine "CRCCAL" which generates check data. The data may be regularly read-out from E²PROM 6. Alternatively, after check data are prepared, checking is carried out since transferring time is too long for practical operation when the amount of data is large.

The temperature in the camera is then measured at "TEMP" and is stored in the RAM of the CPU4. Battery checking, initial resetting of a taking lens and zoom reset are performed at "BATCK", "LENR" and "ZMRST". The program then proceeds to "BKCK" to check the state of a back lid. If the back lid is rendered closed, the film is wound by a predetermined length without being exposed.

Each of "RWTF", "ALTF" and "WDTF" is one bit of data stored in the E²PROM 6. The fact that these data are set means that the power of the camera was turn off when the film was being rewound, fed without being exposed and fed by one frame, respectively. Since these states are held in the involatile memory even if the power of the camera is turned off, each operation can be restarred when the power of the camera is turned on again.

If "RWTF" is 1, the program will proceed to "RWIND" to carry out rewinding control. If "ALTF" is 1, the program will proceed to "ALOAD" to control film feeding without being exposed. If "WDTF" is 1, the program will proceed to "OWIND" to control film winding by one frame. If any one of "RWTF", "ALTF" and "WDTF" is reset, the program will proceed to a step for determining whether an object is in a focusable zone or not.

In this step, it is determined for example whether the object is too close to the camera. If the object is in the focusable zone, the program will proceed to "LCDON" n to display on a liquid display panel 23 (refer to FIG. 4). Then presetting of a counter is carried out at "T90SET" in order to turn off the display if 90 seconds will have passed without receiving any operation instruction. In this embodiment, the CPU4 is rendered the sleep state (STOP), that is, the clocking of the CPU4 is stopped for saving power after the display has been conducted for 90 seconds. Charging is carried out at "SCHRG" if charging of an electronic flash is necessary. Then the program will proceed to "HALT" at which the CPU4 is brought into standby state. At "HALT", the clock of the CPU4 is operative, but an inner program counter stops. More power may be saved than in normal operation so that consumption of battery power may be suppressed.

If the object is not in the "focusable" zone the program will proceed to "LCDOFF" to turn off the liquid crystal display and to bring the CPU4 into a sleep state. The program will return from standby state after a predetermined period of time at "HALT" or if a key input from such as R1SW25, R2SW26, ZUSW27, ZDSW28, SBTSW29, FLSSW30, RMSW14 or remote control signal is generated, the program will immediately return to an operable state. The sleep state at "STOP" assumes the same operation except for returning after a given period of time.

After returning, refreshing of port input/output preset, pull-up preset and the like is carried out "PSET". This refreshing is conducted every predetermined period of time while display on the liquid crystal display panel 23 is continued for 90 seconds. Therefore influence of malfunction may be minimized since the port preset will be returned after a predetermined period of time even if the port preset is reversed due to incoming noise and the like.

Then it is determined whether the camera is in a "remote control mode" or not. If it is in the "remote control mode", the program will proceed to a subroutine "USERD" to read data representative of the film counts, and the afore-mentioned camera state of "RWTF" from E²PROM 6 (refer to FIG. 1) and write them into the RAM of the CPU4. Since an error signal in remote control may be generated due to serial communication noise on writing in the remote control mode, the program will proceed to a subroutine "BKCK" of a back lid checking without reading of the data from E²PROM 6. When the afore-mentioned checking whether or not the back lid is closed in the subroutine "BKCK", the program will proceed to a routine for determining whether a remote control signal is present.

If the remote control signal is present, the program will proceed to a routine "RMCON" to perform remote control processing. If there is no remote control signal, the program will proceed to "RMSEN" to recognize an RM switch 14 and then proceed to "KEYSCAN" to determine key input. If the remote control mode is determined, this state is stored in E²PROM 6. When a predetermined period of time has passed since bringing into the remote control mode, the remote control mode is cancelled to prohibit the remote control mode until the RM switch 14 is again turned on from the off state. This aims to save the current consumed at the interface IC35 when remote control operation is stopped.

The program will proceed to a routine at which it is determined whether the object is in a focusable zone or not. If the object is in the focusable zone, the counts for 90 seconds displaying is decremented at a "DSP90S" Counting is carried out at "RM15M" since a remote control signal is accepted for a given period of time after 90 seconds. If the object is not in the focusable zone, the program will return to a position 1.2 where processing of the afore-mentioned "LCDOFF" or "STOP" is conducted.

If it is determined that "a key input is present" at "KEYSCAN", the program will proceed to "LCDON" to turn on the liquid crystal display panel 23. Then the program will proceed to a subroutine "CRCEXE" where checking whether or not the data of E²PROM stored in RAM of the CPU4 have been destroyed is conducted. If the data of E²PROM 6 have been destroyed, the program will proceed to a routine for determining whether a switch R1SW25 is turned on after operation of the afore-mentioned "EPRD" and CRCCAL. The switch R1SW25 is operated when the release switch 5 is half depressed. If the data of E²PROM 6 have not been destroyed, the program will immediately proceed to a routine for determining the state of "R1SW".

Figure 8:
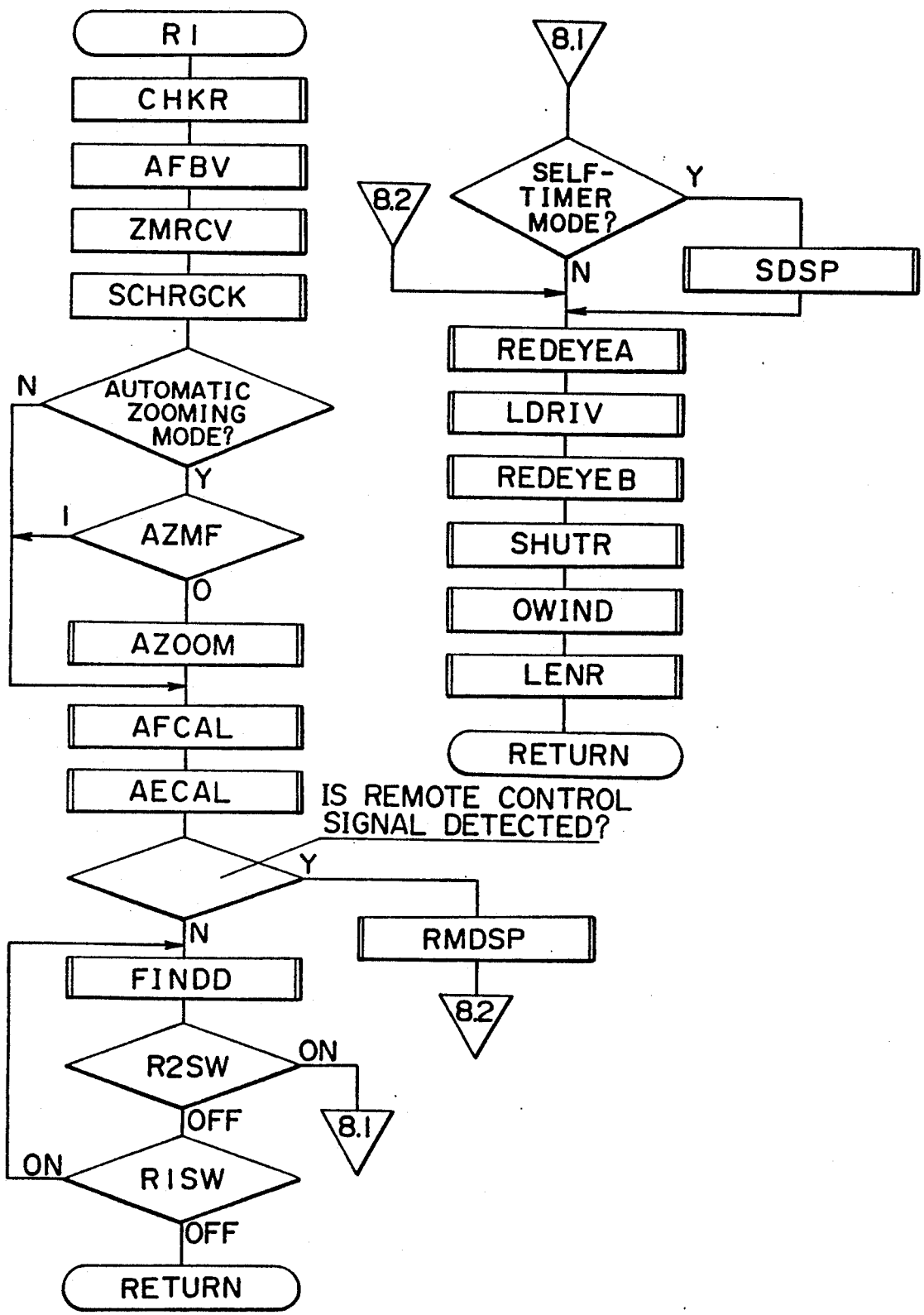
FIG. 8 is a flow chart of a release sequence subroutine "R1" in FIG. 7.

If the switch "R1SW" 25 is turned on, a release sequence operation "R1" which will be described with reference to FIG. 8 is executed. If the "ZUSW" 27 or "ZDSW" 28 is turned on, zoom drive operation "ZOOM" is executed. If the "SBTSW" 29 or "FLSSW" 30 is turned on, mode changing "MCHAN" is executed. If the 90 seconds have not passed since displaying, the program will proceed to a position 1.3. If a timer is counting within a predetermined period of time in remote control mode, the program will proceed to "WAKIS" to preset the waiting time of HALT to be longer than 90 seconds and then branch to the position 1.3. Presetting a longer waiting time of HALT in 90 second display offers a power saving advantage.

Figure 7:
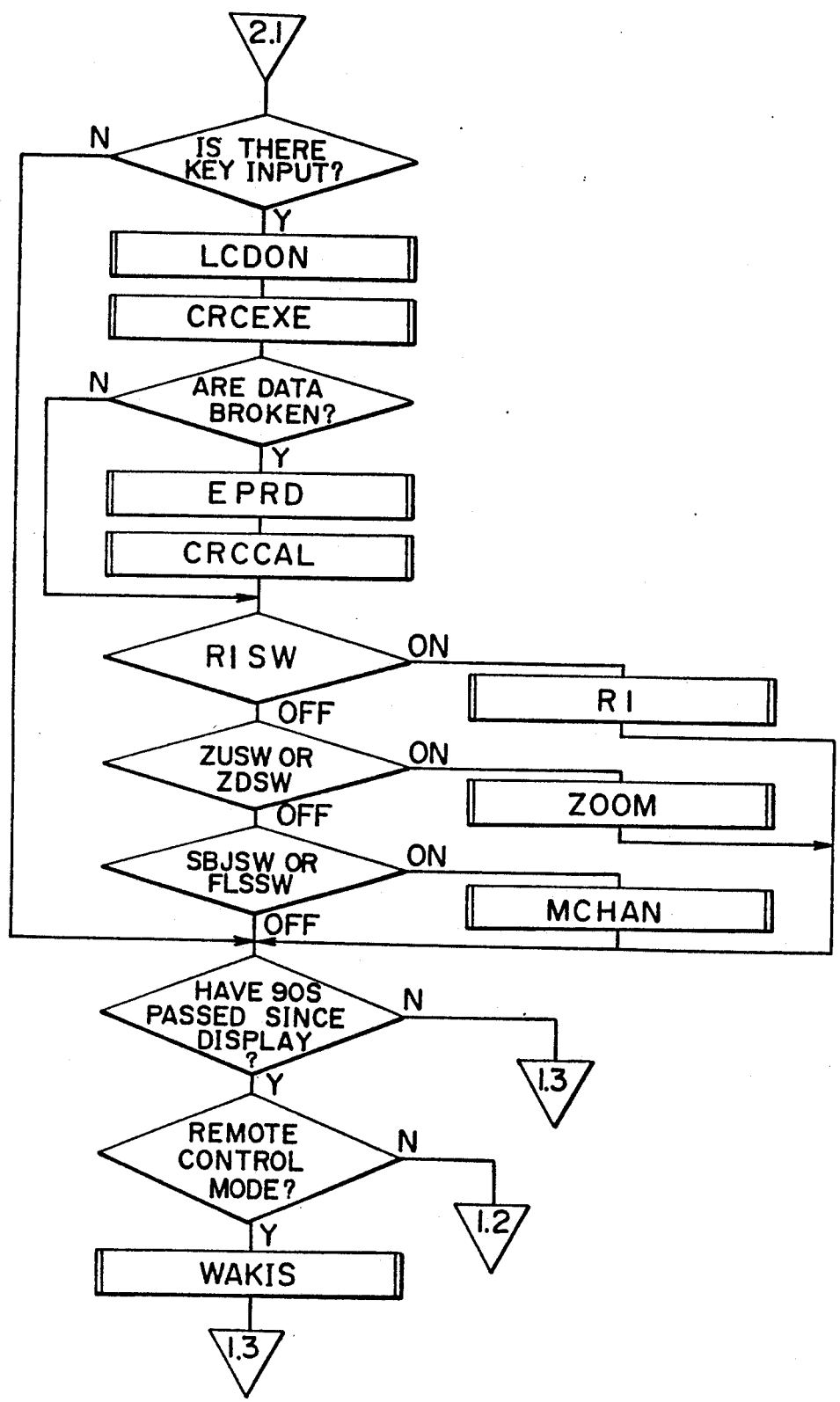

Referring now to FIG. 8, there is shown a flow chart of the release sequence subroutine "R1" shown in FIG. 7. If the switch R1SW 25 is depressed or a remote control signal is received, a subroutine "R1" is called. If an external device requests communication, communication processing is carried out at "CHKR" and then proceeds to "AFBV" to carry out brightness measuring and rangefinding. If the object is not in the focusable zone at "ZMRCV", the taking lens is moved so that the object is in the focusable zone. At "SCHRGCK", the flash charging voltage is checked to determine whether it is possible to flash or not and whether it is necessary to compensate for the flash timing.

When in "automatic zoom mode" a zoom lens is zooming-operated to a target zoom position at "AZOOM". If a zoom up switch ZUSW27 or a zoom down switch ZDSW28 is depressed in "automatic zoom mode", automatic zooming is not performed since "AZMF" is set. Arithmetic operation of the position of the taking lens to be moved is performed at "AFCAL" and arithmetic operation of the exposure is performed at "AECAL".

Figure 9:
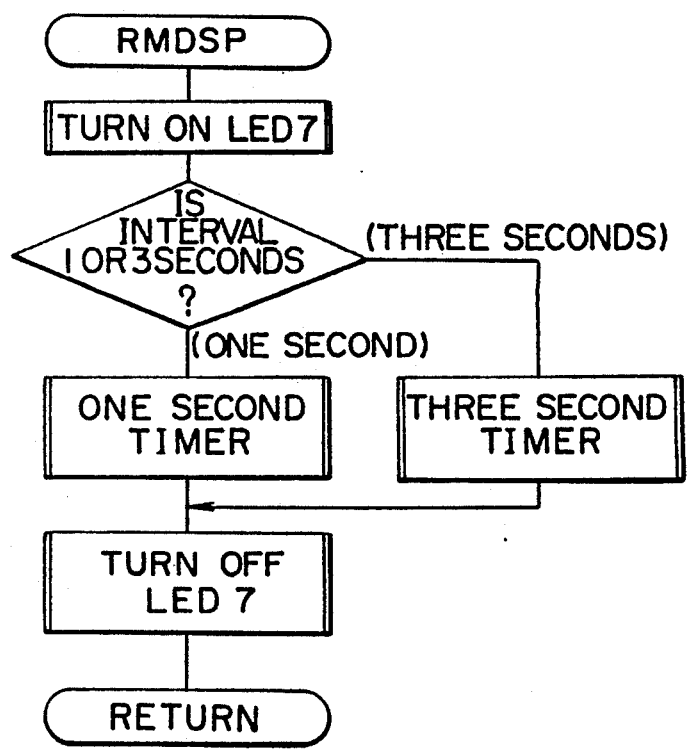
FIG. 9 is a flow chart showing a subroutine RMDSP in FIG. 8 in which the interval between the reception of a remote control signal and the commencement of picture taking may be selected.

A subroutine "RMDSP" which is called in the flow chart R1 in FIG. 8 when the remote control signal is received will be described with reference to FIG. 9.

When the subroutine "RMDSP" is called, flash of the LED7 (refer to FIGS. 1 and 4) indicates to the operator that the remote control signal has been received. At the next step, it is determined whether the interval from the reception of the remote control signal to commencement of the picture taking operation of the camera is preset to one second or three seconds. This interval may be remotely selected by the operator of the remote control and may be preset by coding the combination of the code pulse intervals. If the result of determination shows that the interval is 1 second, a one-second-timer subroutine is called. If it is three seconds, a three-second-timer subroutine is called. LED7 is then turned off. The program will return to the R1 routine.

If a remote control signal is not received, the program will jump to a second release (R2SW is on) waiting loop to execute "FINDD" a display in a finder to light and flicker an LED36 for display in the finder (refer to FIG. 4). If the R2SW26 is turned on, the program will proceed to a routine for determining whether or not the camera is in a self-timer mode. If the camera is in the self-timer mode, the program will proceed to "SDSP" to count for a predetermined period of time and simultaneously display the self-timer mode by LED7.

If it has been determined that it is necessary to take a picture by flashing in a red-eye flash mode and red-eye phenomenon will occur, the program will proceed to "REDEYEA" to generate flash once. The program will then proceed to "LDRIV" to move the taking lens. If there is a condition of preflashing, several pre-flashes are generated at intervals of a predetermined period of time at "REDEYEB". The pre-flashes prevent red-eye phenomenon by contracting the pupil of a person to be photographed prior to exposure.

The program will then proceed to "SHUTR" at which time the shutter is operated and the film is wound by one frame after exposure at "OWIND" and the taking lens which has been moved at "LDRIV" is reset to the initial position at "LENR". Execution of the above-mentioned operations completes a release sequence subroutine "R1" and returns to a main sequence flow of FIGS. 6 and 7.

A remote control signal which is transmitted from the remote control transmission unit 2 (refer to FIG. 4) and received by a receiver circuit in the interface IC35 will now be explained.

Figure 10:
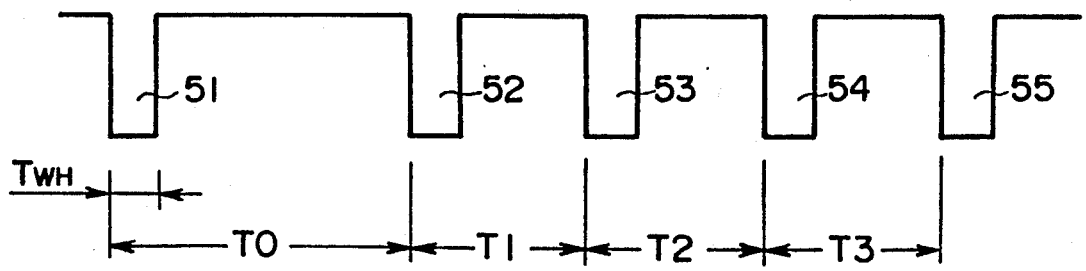
FIG. 10 is a view showing the timing relation of an activating pulse and code pulses transmitted from a remote control transmission unit 13.

Referring now to FIG. 10, there is shown a wave form of a remote control transmission signal transmitted from the remote control transmission unit 2 (refer to FIG. 4). The transmission signal comprises one "L" active activating pulse 51 and code pulses 52, 53, 54, 55. Accordingly, the remote control transmission signals drive the IRED16 shown in FIG. 1 to emit light five times. The light emission signals are detected by the interface IC35 and the light receiving element 15 shown in FIG. 4 and then shaped and fed to the CPU4.

The timing relation of the five light emission pulses are shown in the following Table 1.

TABLE 1

| No | $T_{WH}$ | T0 | T1 | T2 | T3 |
|---|---|---|---|---|---|
| 0 | 131.8 (μs) | 120 (ms) | 45.8 (ms) | 45.8 (ms) | 45.8 (ms) |
| 1 | " | " | 45.8 (ms) | 45.8 (ms) | 54.2 (ms) |
| 2 | " | " | 45.8 (ms) | 54.2 (ms) | 45.8 (ms) |
| 3 | " | " | 45.8 (ms) | 54.2 (ms) | 54.2 (ms) |
| 4 | " | " | 54.2 (ms) | 45.8 (ms) | 45.8 (ms) |
| 5 | " | " | 54.2 (ms) | 45.8 (ms) | 54.2 (ms) |
| 6 | " | " | 54.2 (ms) | 54.2 (ms) | 45.8 (ms) |
| 7 | " | " | 54.2 (ms) | 54.2 (ms) | 54.2 (ms) |

As is apparent from FIG. 10 and Table 1, the pulse width $T_{WH}$ of the activating pulse 51 is preset to a constant value 131.8 μs. When the activating pulse 51 is applied, CPU4 is released from the standby state to be activated. Four code pulses 52, 53, 54 and 55 are fed out after a lapse of T0=120 ms from the start of activating pulse 51. The duration T0 is a time which is taken for the CPU4 to commence the operation.

The occurrence cycle of noise pulses usually generated from a fluorescent lamp has a half of the cycle of the commercial power, that is about 10 msec at 50 Hz and about 8.3 ms at 60 Hz. When the noise pulse is inputted to the receiving circuit, it is considered that the noise signals from the output of the receiving circuit generate at intervals which are integer multiples of the above-mentioned cycles. It is due to a fact that the noise level varies above and below the determination level in the receiving circuit. Therefore, the intervals among the remote control signals are preset to 45.8 ms and 54.2 ms so that they are not equal to an integer multiple of the afore-mentioned cycle of the noise pulse. If the pulse interval is different from the preset values, these noise pulses can be discriminated with the remote control signal by neglecting the noise pulses. This is the subject matter of the present invention.

The purpose of provision of transmission intervals T2 and T3 other than T1 is not only to provide a plurality of transmission codes, but also to reduce the malfunction probability due to incoming noise having a cycle other than 50 Hz and 60 Hz. That is, this transmission unit is capable of transmitting $2^3=8$ combinations of pulses, so that a plurality of camera modes are preset and interference with another camera can be prevented.

Figure 11:
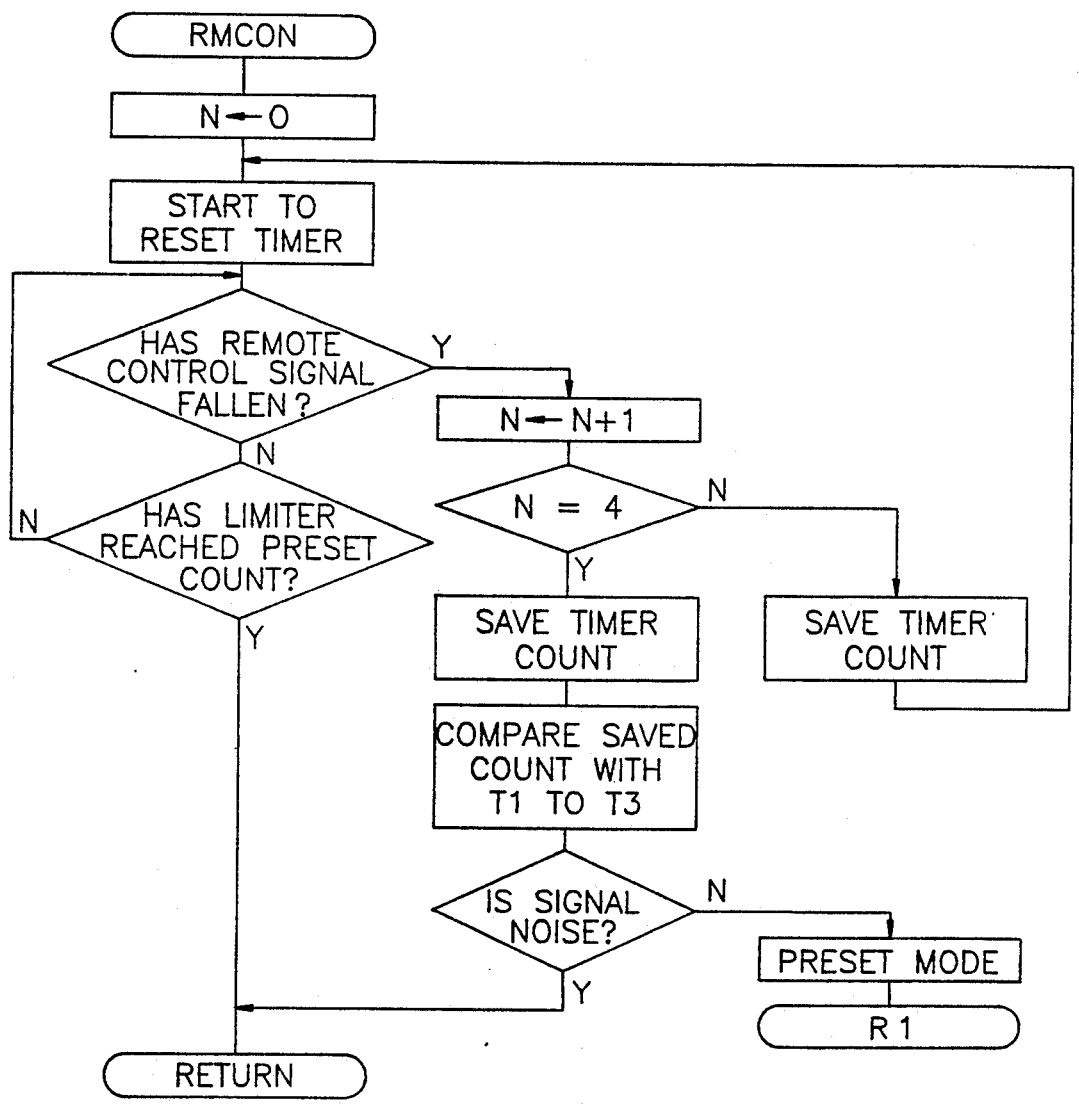
FIG. 11 is a flow chart showing a program for receiving remote control signals.

Referring now to FIG. 11, there is shown a flow chart of a remote control reception program. When the CPU4 is activated with an activating pulse 51 (refer to FIG. 8), a subroutine "RMCON" is called. After the pulse count N stored in the CPU4 is reset to 0, a timer for measuring pulse intervals is reset to start. It is checked whether each of code pulses 52 53 54, 55 following the activating pulse 51 is present or not. That is, the fall of a remote control signal is checked. If there is not a fall of a remote control signal, "limiter" determination is performed. The limiter is preset to about 60 ms. If the count overflows the limiter, the program will return to main flow.

If the falling of the remote control signal is detected, the pulse count N is incremented. If the pulse count N are less than 4, the time value are saved and the program will return to the subroutine "reset to start timer" again. When count N becomes 4, that is, falling of the final code pulse is detected, the timer value is saved and then the saved time value is compared with the transmission intervals T1, T2, T3 shown in Table 1. The transmission interval T0 is neglected since it causes the activating time of the CPU4 to vary.

If the timer value is not equal to the transmission interval as a result of comparison, the program will return to a main flow. If it is equal to the transmission interval, the program will branch to the release sequence subroutine "R1" shown in FIGS. 6 and 7 after accomplishing "preset mode" for taking a picture in the camera, the aforementioned PRESET MODE FOR TAKING PICTURE is a routine for carrying out a release sequence after the CPU4 receives a remote control signal or carrying out a release sequence with a delay.

In accordance with the present invention, a plurality of codes may be transmitted without being interfered with commercial power source having 50 Hz or 60 Hz frequency by a simple circuit and the power consumed by the CPU may be saved to prevent premature depletion of power batteries since the CPU is activated by a first activating pulse of a remote control pulse train.

While the invention has been particularly shown and described with reference to a preferred embodiment, it will be understood by those skilled in the art that the foregoing and other changes in form and details can be made therein without departing from the spirit and scope of the invention.

What is claimed is:

1. A wireless remote control apparatus comprising a receiver circuit for use in connection with a camera having a camera body and an independent transmitter unit;

said independent transmitter unit including means for generating a single start pulse for activating said receiver circuit of said camera and four code pulses spaced by predetermined intervals to represent a predetermined number of code combinations, each combination corresponding to a given operation of the camera, said code pulse signals being generated a predetermined time after generation of said single start pulse;

transmitting means for transmitting said activating pulse signal and code pulse signals;

said receiver circuit including means for detecting the single start pulse and four code pulses transmitted from the transmitting means and means normally deactivated for decoding the code pulse signals when activated;

means for activating said decoding means in response to only the single start pulse of the pulses detected by said detecting means;

said decoding means being responsive to said means for activating for decoding only the code pulses to determine the camera operation represented by the intervals among the code pulse signals detected by said detecting means; and means for causing the camera to execute a predetermined operation in accordance with the combination of intervals between the code pulse signals decoded by said decoding means, said receiver circuit including discriminating means for determining whether or not the intervals between the code pulse signals detected after the single start pulse are equal to predetermined intervals and for neglecting the code pulses as noise when at least one of the intervals between the detected code pulse signals is not equal to said predetermined intervals.

2. A wireless remote control apparatus for a camera as defined in claim 1 in which said camera includes a camera body, said transmitting means being detachably mounted on said camera body.

3. A wireless remote control apparatus for a camera as defined in claim 1 in which intervals among said code pulses are not an integer multiple of a period of noise from commercial electric power which is one of 50 cycle a.c. or 60 cycle a.c.

4. A wireless remote control apparatus for a camera as defined in claim 3 in which a period of noise from commercial electrical power which is one of 50 cycle a.c. or 60 cycle a.c. is 10 msec or 8.3 msec, respectively.

5. A wireless remote control apparatus as defined in claim 1 in which said predetermined time is not an integer multiple of the time intervals between code pulses and is 120 msec.

6. A wireless remote control apparatus as defined in claim 1 in which said transmitting means includes a light emitting element for generating infrared light pulses.

7. A wireless remote control apparatus as defined in claim 6 in which said infrared light pulses have a wave length in the range of approximately 900 to 950 nm.

8. A camera system comprising a camera and a wireless remote control transmitter for remotely controlling the camera;

said remote control transmitter including means for transmitting a pulse train having an activating pulse for changing a control circuit in the camera from a standby state of reduced power consumption during which no code pulse evaluation can be performed to an operating state during which code pulse evaluation and photographing operations may be performed and execution pulses transmitted a given period of time after the activating pulse, said camera including means for receiving the pulse train transmitted from the transmitter; and control means which assumes the operating state from the standby state responsive only to receipt of the activating pulse of the received pulse train and executes a predetermined operation mode of the camera instructed only by the received execution pulses following the received activating pulse;

means responsive to completion of said predetermined operation mode of the camera for returning the camera to the standby state; and said control means being returned to the standby state without executing the predetermined operation mode when at least one execution pulse has not been received for a predetermined period of time after a reception of an activating pulse.

9. A camera system comprising a camera and a remote control transmitter for remotely controlling the camera:

said remote control transmitter including means for transmitting an infrared light as a control signal including a single start pulse and a plurality of code pulses separated by predetermined intervals, combinations of said intervals representing a plurality of transmission codes;

said camera including means for receiving the control signal transmitted from the transmitter and control means for executing a predetermined operating mode of the camera represented by a signal received from said transmitter;

said receiving means providing an activating output upon receipt of said single start pulse; and means responsive to said activating output for comparing an arrangement of pulse intervals among the plurality of said code pulses with preliminarily preset combinations of pulse intervals among code pulses stored in a memory means and operating said control means for executing a predetermined operation stored in said memory means and associated with a stored preset combination whose intervals are the same as a combination of intervals of code pulses received by said means for receiving.

10. A camera system as defined in claim 9 in which intervals among the plurality of said pulses are not integer multiples of a period of noises emitted from a commercial power source which is one of 50 cycle a.c. and or 60 cycle a.c.

11. A camera system comprising a camera and a remote control transmitter for remotely controlling the camera;

said remote control transmitter including means for transmitting an infrared light pulses as a control signal including a train of a single activating pulse for changing a control circuit in the camera from a standby state of reduced power consumption to an operative state of increased power consumption and a plurality of code pulses transmitted a predetermined period of time after the single activating pulse, so that one of a plurality of operating modes of the camera is instructed by specifying intervals among the code pulses;

said camera including:

means for receiving the control signal transmitted from the remote control transmitter; and control means which assumes the operative state from the standby state responsive only to the single activating pulse of a control signal received from said transmitter and executes a predetermined operating mode of the camera instructed by code pulses received by said control means and following the received single activating pulse; and means for comparing pulse intervals among a plurality of code pulses received from said transmitter with preliminarily preset combinations of intervals among code pulses stored in a memory and for executing a predetermined operating mode instructed by one of the preliminarily preset combinations of intervals among code pulses stored in said memory when intervals of code pulses received from said transmitter are the same as the intervals of one of the preliminarily preset combinations of intervals among code pulses stored in said memory.

12. A camera system as defined in claim 11 further comprising means responsive to completion of said predetermined operation mode of the camera for returning the camera to the standby state.

13. A remote control transceiver for remotely controlling a camera, comprising:

means for transmitting an infrared light pulse train as a control signal including a train of a single activating pulse for changing a control circuit in the camera from a standby state of reduced power consumption to an operating state of increased power consumption and during which code pulses can be evaluated and a plurality of code pulses transmitted a predetermined period of time after the single activating pulse for controlling a camera operation; and switching means for changing pulse intervals among the plurality of the code pulses;

each intervals among the plurality of said code pulses being different from an integer multiple of a period of noises emitted from a commercial power source which is one of 50 cycle a.c. or 60 cycle a.c.;

an interval Tc among the plurality of said code pulses being represented by an equation:

$$Tc = \frac{nT1 + mT2}{2}$$

(wherein n, m represent any real integer not less than zero, and T1 and T2 represent periods of the noises emitted from commercial power source); and means for changing the control circuit to the operating state responsive only to receipt of said activating pulse and means responsive to a predetermined combination of code pulse intervals for operating the camera in a photographing mode represented by the code pulses.

14. A camera system comprising a camera having a plurality of picture taking modes and a wireless remote control transmitter employing infrared light pulses as a control signal including a start pulse and a plurality of code pulses for remotely controlling the camera, which is detachably mounted on the camera, said camera including means for detecting a removal of the transmitter from the camera to provide an instruction signal;

means responsive to the instruction signal from said detecting means for presetting an operating state of the camera to a remotely controlled picture taking mode during which a photographing operation may take place;

timing means being activated responsive to the instruction signal;

means for receiving said control signal transmitted from the remote control transmitter for remotely controlling a selection of a picture taking mode;

control means which changes to a standby state during which no photographing operations may take place when said timing means indicates a predetermined time has elapsed before receipt of a start pulse;

said control means changing from a standby state of reduced power consumption during which no evaluation of code pulses may take place to an active state in response to an activating pulse of the signal received by said receiving means including means activated to determine an operation represented by the code pulses responsive to said active state and means responsive to said determining means to execute a predetermined operation instructed by a plurality of code pulses received following the activating pulse;

second means for accumulating elapsed time responsive to initiation of the standby state; and means for cancelling a remotely controlled picture taking mode to change the control means to an inoperative state when said second means accumulates a predetermined elapsed time.

15. A camera system as defined in claim 14 further comprising means responsive to completion of said predetermined operation mode of the camera for returning the camera to the standby state.

16. A camera system as defined in claim 14 wherein said cancelling means comprises timing means and means for initiating a cancelling operation when said timing means reaches a predetermined time value before a signal is received from said remote control transmitter.

17. A method of controlling a remotely controllable camera having a control means for transferring the camera to one of an operating state during which a picture taking operation may be performed and a standby state of reduced power consumption during which no picture taking operation may be performed, comprising the steps of:

providing operating power to the camera thereby placing the camera in the operating state;

placing the camera in a standby state if no activating signal is received a predetermined time after initiation of the operating state;

generating, at a location remote from said camera, an infrared remote control signal having an activating pulse followed by selective code pulses arranged at predetermined intervals to initiate a picture taking operation;

changing the standby state of the camera to said operating state in response to receipt of only the activating pulse; and executing a predetermined camera operation in accordance with a predetermined arrangement of intervals of a plurality of received code pulses following the activating pulse.

18. The method of claim 17 further comprising the step of returning the camera to the standby state when the predetermined operation has been performed.

19. A method of controlling a remotely controllable camera having a control means for transferring the camera to one of an operating state during which a photographing operation may be performed and a standby state of reduced power consumption during which no photographing operation may be performed, comprising the steps of:

generating from a location remote from the camera an infrared remote control signal having a single activating pulse and selective code pulses to initiate a picture taking operation;

changing a standby state of the camera into said operating state in response to only the activating pulse of the remote control signal applied to an infrared signal receiving means;

receiving the control signal and comparing the arrangement of intervals among a plurality of the code pulses following the activating pulse with a group of preliminarily preset pulse interval arrangements stored in the camera, each pulse interval arrangement being associated with a predetermined camera operating mode; and executing a predetermined operation of the camera in accordance with an operating mode associated with a code pulse interval arrangement which compares with a received code pulse interval arrangement.

20. The method of claim 19 further comprising the step of returning the camera to the standby state when a predetermined operation has been performed.

21. A camera system comprising a camera and a wireless remote control transmitter for remotely controlling the camera, which is detachably mounted on a camera body of the camera, said remote control transmitter including means for transmitting an infrared control signal including a composite signal comprised of a single activating pulse and a plurality of code pulses occurring at selected spaced intervals from said single activating pulse;

said camera including:

means for receiving the control signal from said transmitter;

control means having a standby state for preventing evaluation of code pulses and a camera operating state for enabling evaluation of code pulses to selected a predetermined photographing operation, said standby state requiring less operating power than said camera operating state;

said control means further including means responsive only to receipt of said single activating pulse by said receiving means for shifting said control means from said standby state to said camera operating state;

said control means further including means responsive only to code pulses received for operating the camera according to a camera operating mode represented by predetermined intervals of received code pulses.

22. A camera system as defined in claim 21 wherein said control means comprises a microprocessor having clock means and a program counter, said program counter being off and said clock means being on in said standby state and said clock means and said program counter being on when in the camera operating state.

23. A camera system comprising a camera and a wireless remote control transmitter for remotely controlling the camera, which is detachably mounted on a camera body of the camera, said remote control transmitter including means for transmitting an infrared control signal including a composite signal comprised of an activating pulse and a plurality of code pulses occurring at selected spaced intervals from said activating pulse;

said camera including:

means for receiving the control signal from said transmitter;

control means having a standby state for preventing evaluation of code pulses and a camera operating state for enabling evaluation of code pulses to select a predetermined photographing operation, said standby state requiring less operating power than said camera operating state;

said control means further including means responsive only to receipt of said activating pulse by said receiving means for shifting said control means from said standby state to said camera operating state;

said control means further including means responsive only to code pulses received for operating the camera according to a camera operating mode represented by predetermined intervals of received code pulses;

timing means for initiating a timing interval when in the standby state and means for shifting the control means to a sleep state when said timing means reaches a predetermined value before the camera receives a signal from said transmitter.

24. A camera as defined in claim 23 wherein said control means further including means to prevent operation of the camera by said transmitter after being shifted to the sleep state.

25. A camera as defined in claim 24 further comprising a manually operable member, said control means including means responsive only to operation of said manually operable member for shifting said control means from said sleep state to said operating state.

26. A camera as defined in claim 23 wherein said clock means is turned off during said sleep state.

27. A method for operating a camera having a control unit from a remote location by a wireless transmitter releasably mounted upon the camera comprising the steps of:

(a) sequentially transmitting a single start pulse and a group of at least three code pulses, a first one of the code pulses being spaced a predetermined interval from said start pulse sufficient in length to enable the control unit to turn on and each of the remaining code pulses being spaced from the preceding pulse by an interval of either a first or second length each different from said predetermined interval whereby each combination of intervals represents a particular operating mode;

(b) detecting the transmitted pulses at said camera;

(c) turning the control unit on responsive only to said start pulse;

(d) counting the number of code pulses;

(e) counting the time between each code pulse and the next occurring code pulse to determine the time interval between successive code pulses;

(f) comparing the measured time intervals with time intervals in a time interval table stored in a camera memory and representing a plurality of combinations of time intervals, when the count of the number of code pulses reaches a predetermined value; and (g) performing a camera operation responsive to an operation stored in said memory and associated with a group of time intervals of said table which compares with the measured time intervals.

28. The method of claim 27 wherein step (e) further comprises the step of returning to step (a) when a time interval measured between any two successive code pulses exceeds a predetermined value.

29. The method of claim 27 wherein the transmitted pulses are light pulses of a predetermined wave length.

30. The method of claim 29 wherein the light pulses lie within the infrared range.

31. The method of claim 30 wherein the light pulses are within the range of 900–950 nanometers.

32. The method of claim 29 wherein the time intervals between successive code pulses are non-integer multiples of noise produced by 50 Hz and/or 60 Hz power sources.

33. The method of claim 27 wherein intervals between successive code pulses is one of two time intervals including 45.8 milliseconds and 54.2 milliseconds.

34. The method of claim 27 wherein the time interval employed in step (e) is greater than a maximum acceptable interval, said maximum acceptable interval being 54.2 milliseconds and said predetermined value is 60 milliseconds.

35. A method of controlling a remotely controllable camera having a control means for transferring the camera to one of an operating state during which a picture taking operation may be performed and a standby state of reduced power consumption during which no picture taking operation may be performed, comprising the steps of:

(a) providing operating power to the camera thereby placing the camera in the operating state;

(b) placing the camera in a standby state if no activating signal is received a predetermined time after initiation of the operating state;

(c) generating, at a location remote from said camera, an infrared remote control signal having a single activating pulse followed by selective code pulses arranged at predetermined intervals to initiate a picture taking operation;

(d) changing the standby state of the camera to said operating state in response to receipt of the single activating pulse;

(e) initiating a count representing elapsed time responsive to receipt of a first code pulse;

(f) incrementing a second count when each code pulse makes a given change in signal level;

(g) stopping the count initiated in step (e) upon receipt of a succeeding code pulse;

(h) storing an accumulated count halted in step (g);

(i) repeating steps (e) through (h) until the second count initiated in step (f) reaches a predetermined count;

(j) comparing the counts stored during each of the repeated steps (h) with predetermined stored values; and (k) rejecting the received signals as noise when at least one of the counts stored in steps (h) is different from an associated stored count.

36. A method of controlling a remotely controllable camera having a control means for transferring the camera to one of an operating state during which a picture taking operation may be performed and a standby state of reduced power consumption during which no picture taking operation may b performed, comprising the steps of:

(a) providing operating power to the camera thereby placing the camera in the operating state;

(b) placing the camera in a standby state if no activating signal is received a predetermined time after initiation of the operating state;

(c) generating, at a location remote from said camera, an infrared remote control signal having a single activating pulse followed by selective code pulses arranged at predetermined intervals to initiate a picture taking operation;

(d) changing the standby state of the camera to said operating state in response to receipt of the single activating pulse;

(e) initiating a count representing elapsed time responsive to receipt of a first code pulse;

(f) terminating the count upon receipt of the next code pulse; and (g) employing the accumulated count and determining the count to be valid when it compares with a stored reference value.

37. A method of controlling a remotely controllable camera having a control means for transferring the camera to one of an operating state during which a picture taking operation may be performed and a standby state of reduced power consumption during which no picture taking operation may be performed, comprising the steps of:

(a) providing operating power to the camera thereby placing the camera in the operating state;

(b) placing the camera in a standby state if no activating signal is received a predetermined time after initiation of the operating state;

(c) generating, at a location remote from said camera, an infrared remote control signal having a single activating pulse followed by selective code pulses arranged at predetermined intervals to initiate a picture taking operation;

(d) changing the standby state of the camera to said operating state in response to receipt of the single activating pulse;

(e) counting elapsed time between code pulses;

(f) disregarding the code pulses as noise when they fall outside of predetermined limits; and (g) performing a control function when elapsed times between code pulses compare with a stored predetermined elapsed time combination representing said control function.

* * * * *

UNITED STATES PATENT AND TRADEMARK OFFICE
CERTIFICATE OF CORRECTION

PATENT NO. : 5,323,203
DATED : June 21, 1994
INVENTOR(S) : Atsushi Maruyama and Masataka Ide It is certified that error appears in the above-indentified patent and that said Letters Patent is hereby corrected as shown below:

Column 1, line 61, change "is the the same" to --is the same--.
Column 2, line 21, change "fop" to --for--.
Column 2, line 23, change "fop" to --for--.
Column 2, line 61, change "invent ion wi 11" to --invention will--.
Column 2, line 65, after "invention" insert --.--.
Column 2, line 68, after "recess" insert --1a--.
Column 3, line 11, after "element" insert --7--.
Column 3, line 40, change "fop" to --for--.
Column 3, line 41, change "off" to --of--.
Column 3, line 64, change "$1_1$" to --$\ell_1$--.
Column 3, line 65, change "$1_2$" to --$\ell_2$--.
Column 4, line 1, after "by" insert -- Ⓐ --.
Column 4, line 63, before "shutter" insert --a--.
Column 5, line 66, change "re/ease" to --release--.
Column 6, line 9, after "ZUSW)" insert --27--.
Column 6, line 13, change "tale" to --tele--.
Column 6, line 28, delete "the".
Column 6, line 51, change "in" (first occurrence) to --of--.
Column 7, line 21, change "5" to --7--.
Column 7, line 25, change "Gen" to --gen--.
Column 7, line 51, change "turn" to --turned--.
Column 7, line 55, change "restarred" to --restarted--.
Column 8, line 1, before "to" delete "n".
Column 8, line 6, after "dered" insert --to--.
Column 8, line 65, change "The" to --Then the--.
Column 9, line 17, change "CRCCAL" to --"CRCCAL"--.
(quotes omitted)

UNITED STATES PATENT AND TRADEMARK OFFICE
CERTIFICATE OF CORRECTION

PATENT NO. : 5,323,203
DATED : June 21, 1994
INVENTOR(S) : Atsushi Maruyama and Masataka Ide It is certified that error appears in the above-indentified patent and that said Letters Patent is hereby corrected as shown below:

Column 11, line 34, change "52 53 54, 55" to --52, 53, 54, 55--.
Column 11, line 43, change "are" to --is-- (both occurrence).

Column 16, line 17 of Claim 21, change "lected" to --lect--.
Column 19, line 6 of Claim 36, change "b" to --be--.

Signed and Sealed this

Thirteenth Day of June, 1995

Attest:

BRUCE LEHMAN

Attesting Officer     Commissioner of Patents and Trademarks